3,397,218
PROCESS FOR PREPARING SODIUM
METHYL ARSONATE
Paul A. Mazur, Dumont, N.J., assignor, by mesne assignments, to Shamrock Corporation, a corporation of Delaware
No Drawing. Filed June 1, 1965, Ser. No. 460,485
7 Claims. (Cl. 260—442)

The present invention relates to a composition for promoting methylation reactions and an improved method for the production of sodium methyl arsonate. Specifically, the present invention relates to a composition for promoting methylation in the preparation of sodium methyl arsonate.

According to the method disclosed in U.S. Patent 2,442,372 sodium methyl arsonate is produced by first preparing an aqueous solution of sodium arsenite by reacting arsenious oxide with sodium hydroxide and methylating the sodium arsenite with methyl chloride at elevated temperatures and pressure to form the sodium methyl arsonate. While this method has achieved commercial acceptance because it was found to be more effective than prior art methods previously employed, long reaction times are required to produce the sodium methyl arsonate. Further, even with long reaction times the yields of sodium methyl arsonate produced are not economically feasible. That is, the production of sodium methyl arsonate by the method described in the above-identified patent is expensive due to the increase in production cost in tying up equipment and manpower.

It has now been found that high yields of sodium methyl arsonate may be produced in a relatively short period of time by conducting the methylation reaction in the presence of a promoter comprising a mixture of a hydrocarbon material liquid under the reaction conditions and free from any reaction active substituents, said material having a boiling point within the range from about 35° to 350° C., preferably from about 60° to 325° C. and containing about 5 to 22 carbon atoms, preferably 6 to 12 carbon atoms, and a saturated aliphatic ketone having the following structure:

wherein R is a lower alkyl radical of 1 to 8, preferably 1 to 4, carbon atoms and R¹ is a lower alkyl radical of 1 to 8, preferably 1 to 4, carbon atoms.

The promoter may be present in methylation reactions in amounts ranging from about 1 to 40%, preferably 5 to 20%, by volume based on the volume of the reaction medium. The proportions of hydrocarbon and ketone in the promoter may vary; but the promoter should be miscible, i.e., soluble, dispersible or compatible, in the aqueous reaction medium. Suitable proportions of hydrocarbon and ketone in the promoter composition include the hydrocarbon material present in amounts from about 50% to 99%, preferably 60% to 95%, by volume based on the volume of promoter; and the ketone constituting the remaining 1% to 50%, preferably 5% to 40%, by volume based on the volume of promoter. The exact proportion of hydrocarbon material to ketone will of course depend on the particular hydrocarbon and ketone employed in the promoter system; that is, as the molecular weight or carbon chain of the hydrocarbon material is increased the proportion of ketone employed in the promoter should likewise be increased in order to insure the miscibility of the promoter in the aqueous reaction medium throughout the course of the methylation reaction. The promoter should, of course, at all times be miscible in the aqueous reaction medium throughout the course of reaction and adjustments of the proportions of the hydrocarbon and ketone in the promoter may be made accordingly.

Suitable hydrocarbon material include the aliphatic, cycloaliphatic and aromatic hydrocarbons such as pentane, hexane, heptane, octane, naphtha, kerosene and other petroleum fractions; hexene, heptene, octene, etc.; cyclopentane, dimethylcyclopentane, cyclohexane, ethylcyclohexane, cycloheptane, etc.; cylohexene, cycloheptene, tetralin, etc.; benzene, toluene, xylene, etc. The hydrocarbon employed, as aforesaid, should be liquid under the reaction conditions and free from any reaction active substituents; that is, the hydrocarbon material employed should contain no substituents which would be reaction active during the course of the methylation reaction and deleteriously affect the methylation reaction or the final product, sodium methyl arsonate.

Illustrative of suitable saturated aliphatic ketones are the saturated aliphatic ketones, e.g., acetone, methyl ethyl ketone, methyl isopropyl ketone, methyl isobutyl ketone, diethyl ketone and the like; and the substituted ketones, e.g., acetol, methyl glyoxal, p-hydroxyacetophenone and the like.

To carry out the preparation of sodium methyl arsonate by the method of the present invention, the procedure as broadly outlined in U.S. Patent 2,442,372 may be employed. Essentially, this initially involves preparing sodium arsonite by reacting arsenious oxide with sodium hydroxide according to the following equation:

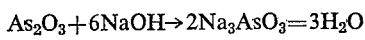

To the sodium arsenite solution is added the promoter. After the promoter is thoroughly mixed into the sodium arsenite solution, methylation with any suitable methylating agent such as methyl iodide, dimethyl sulfate, methyl chloride, etc., may be conducted employing typical methylating conditions. For instance, the temperatures may be within the range of about 50° to 150° C., preferably 60° to 120° C., with pressures ranging from atmospheric up to about 200 or more p.s.i.g., preferably 50 to 150 p.s.i.g.

Methylation may be carried out either batchwise or in a continuous process. In a batchwise process, it is advantageous to employ adequate stirring means to insure that the methylating agent is in thorough and continuous contact with the sodium arsenite solution. In either method, once the reaction has gone substantially to completion, i.e., in excess of 90% the sodium methyl arsonate may be separated from the reaction medium by any of the well-known separation means. Since essentially none of the promoter of the present invention enters into the methylating reaction, the promoter may be separated from the reaction mixture by decantation, distillation or any other suitable means and recycled to the reaction zone for further use.

In order that those skilled in the art may better understand the present invention and the preferred method by which it may be practiced, the following specific examples are offered.

Example 1

Into an 80-gallon stainless steel reactor are charged 131 lbs. of 99% arsenious oxide and 350 lbs. commercial grade, 50% caustic soda. This mixture is agitated for one hour at about 150 r.p.m.s and then 200 lbs. of water are added. This solution is continuously stirred. To this solution is added 5 gallons of the promoter comprising 10% by volume based on the volume of promoter of methyl ethyl ketone and 90% by volume based on the volume of promoter of Varnolene, manufactured by Standard Oil of Ohio, and comprising mineral spirits having a boiling range of about 300° to 320° F. Into this reaction vessel is continuously injected methyl chloride at a rate to maintain the pressure in the reaction vessel during the methylation reaction at 80 p.s.i.g. The temperature in the reaction vessel is maintained within the range of about 60° to 65° C. and the agitator speed is maintained at a rate of about 150 r.p.m.s. The methylation reaction is contained for a period of 4 hours after which conversion of the sodium arsenite to sodium methyl arsonate amounted to 96%. After an additional 2 hours of methylation time, the conversion of sodium arsenite to sodium methyl arsonate was 98.7%.

Example 2

For purposes of comparison the procedure of Example 1 was followed except that no promoter was added to the reaction vessel. The methylation reaction was conducted for a period of 300 hours. At the end of this period, the degree of conversion of the sodium arsenite to sodium methyl arsonate was only 28%.

As can be readily seen from the comparison of the above data, conducting the methylation reaction in the presence of the promoter of the present invention greately increases the amount of sodium methyl arsonate produced in a relatively small fraction of time.

It is to be understood that although the invention has been described with specific reference to particular embodiments thereof, it is not to be so limited since changes and alterations therein may be made which are within the full intended scope of this invention as defined by the appended claims.

What is claimed is:

1. In a process for preparing sodium methyl arsonate by methylating an aqueous sodium arsenite solution with a methylating agent under methylation conditions, the improvement which comprises conducting said methylation reaction in the presence of a water-miscible promoter composition comprising a mixture of a saturated aliphatic ketone having the following formula:

wherein R and $R^1$ are lower alkyl radicals containing 1 to 4 carbon atoms and a hydrocarbon material liquid under the reaction conditions and free from any reaction active substituents containing 5 to 22 carbon atoms and having a boiling point within the range from about 35° to 350° C.

2. The method of claim 1 wherein the promoter is present in the reaction system in amounts from about 1% to 40%, by volume based on the volume of the reaction mixture.

3. The process of claim 2 wherein the promoter is present in the reaction system in amounts from about 5% to 20% by volume of the reaction mixture.

4. The process of claim 1 wherein the promoter composition comprises 1% to 50%, by volume based on the volume of the promoter of the ketone and the hydrocarbon material constitutes the remaining 50% to 99%, by volume.

5. The process of claim 1 wherein the hydrocarbon material contains 6 to 12 carbon atoms and has a boiling point within the range from about 60° to 325° C.

6. The process of claim 4 wherein the ketone is present in the promoter in amounts from about 5 to 40% by volume and the hydrocarbon material constitutes the remaining 60% to 95%, by volume.

7. In a process for preparing sodium methyl arsonate by methylating an aqueous sodium arsenite solution with methyl chloride under methylation conditions, the improvement which comprises conducting the methylation reaction in the presence of about 5 to 20% by volume based on the volume of sodium arsenite solution of a promoter comprising a mixture of 5 to 40% by volume based on the volume of said promoter of a saturated aliphatic ketone having the following structure:

wherein R and $R^1$ are lower alkyl radicals of 1 to 4 carbon atoms and 60% to 95% by volume based on the volume of the promoter of a hydrocarbon material liquid under the reaction conditions and free from any reaction active substituents containing 6 to 12 carbon atoms and having a boiling point within the range from about 60° to 325° C.

References Cited

UNITED STATES PATENTS

| | | | |
|---|---|---|---|
| 2,150,334 | 3/1939 | McKittrick et al. | 252—364 X |
| 2,153,895 | 4/1939 | McKittrick et al. | 252—364 X |
| 2,191,136 | 2/1940 | Tijmstra et al. | 252—364 X |
| 2,442,372 | 6/1948 | Miller et al. | 260—442 |
| 2,695,306 | 11/1954 | Miller et al. | 260—442 |
| 2,850,461 | 9/1958 | Bloch et al. | 252—364 |
| 2,889,347 | 6/1959 | Schwerdle | 260—442 |
| 3,105,809 | 10/1963 | Butler et al. | 252—364 |
| 3,322,805 | 5/1967 | Schanhals et al. | 260—442 |

TOBIAS E. LEVOW, *Primary Examiner.*

W. F. W. BELLAMY, *Assistant Examiner.*